Patented Sept. 11, 1928.

1,684,273

UNITED STATES PATENT OFFICE.

ERIC BERKELEY HIGGINS, OF BRENTFORD, ENGLAND, ASSIGNOR OF ONE-HALF TO BRITISH SYNTHETICS LIMITED, OF MANCHESTER, ENGLAND, A COMPANY OF GREAT BRITAIN.

MANUFACTURE OF CHLORIDES OF AROMATIC ORTHO-HYDROXY-CARBOXYLIC ACIDS.

No Drawing. Application filed March 31, 1927, Serial No. 180,069, and in Great Britain July 20, 1926.

This invention relates to the manufacture of chlorides of aromatic ortho-hydroxy-carboxylic acids, and particularly of such acids of polynuclear hydrocarbons such as the chlorides of ortho-hydroxy-carboxylic acids of naphthalene.

Methods are known for preparing 2:3 hydroxynaphthoyl chloride, but such methods are only practical on a laboratory scale. They depend upon the action of thionyl chloride upon the 2:3 hydroxynaphthoic acid. If the thionyl chloride is used in excess and the body distilled under vacuum, the action takes place very quickly but cannot be used commercially owing to the high cost of the thionyl chloride and the liability of reactions of the nature of internal condensations taking place when the thionyl chloride is used in excess, which reactions lead to the formation of bodies such as xanthones which are practically useless. The action can also be carried out by allowing the theoretical amount of thionyl chloride to come into contact with the 2:3 hydroxynaphthoic acid, but excess of a solvent has to be employed for otherwise owing to the relatively small volume of thionyl chloride required it is impossible to mix the materials uniformly. The presence of the solvent slows down the action so much that it is only usually completed after a period of twelve hours which action renders it impracticable commercially. Also, the velocity of reaction cannot be increased by raising the temperature, since at temperatures above 60° C., particularly in the presence of thionyl chloride not yet combined, reactions of the nature of internal condensations readily take place.

According to the present invention the chlorides of aromatic ortho-hydroxy-carboxylic acids are produced by causing thionyl chloride to act upon an inorganic salt of the acid in question, the two reagents being mechanically ground or mixed together. They are preferably employed in the theoretical ratio and, in these circumstances, a yield may be obtained which is substantially quantitative in respect to both reagents. As an example, thionyl chloride may be added to the mono-sodium salt of 2:3 hydroxynaphthoic acid in the dry powdered conditon, the grinding action preferably taking place in a ball mill which allows the sulphur dioxide evolved to escape freely.

The invention will be more clearly understood and particulars of the methods of carrying out reactions in accordance with the invention will be appreciated by the aid of the following details given as examples within the invention.

Example 1.

210 kilogrammes of dry mono-sodium hydroxynaphthoate in the form of a very fine powder is brought into a ball mill. It is desirable that the sodium salt be dry since water decomposes about seven times its own weight of thionyl chloride and to this extent renders the operation uneconomic. The ball mill is arranged so that the gases evolved when the thionyl chloride is added may escape. Then to the sodium salt in the ball mill is added, preferably as a regular fine spray, 119 kilogrammes of liquid thionyl chloride. Sulphur dioxide comes off freely and regularly and the reaction is completed in about 10 minutes according to the equation:—

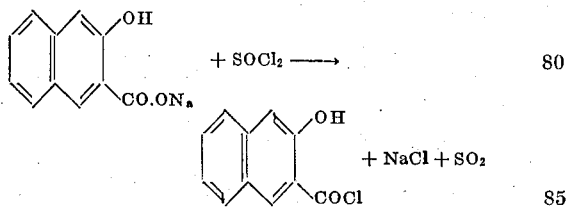

Care must be taken that the temperature shall not rise above 60° C. and the distribution of the thionyl chloride should be as even and regular as possible. It can be introduced by a pipe passing through hollow trunnions in the ball mill and ending in a fine jet. By the above method an extremely fine brilliant yellow powder is obtained which contains sulphur dioxide in the gaseous form entangled in it. It is desirable to cause a very slow stream of dry air to pass through the mass after the reaction is completed to remove this sulphur dioxide. If carried out with care, the reaction gives a 100% yield. Occasionally, however, due to faulty manipulation, small amounts of uncombined trionyl chloride may remain together with an equivalent amount of the original sodium salt. For most purposes the thionyl chloride can be removed without detriment to the subsequent use of the product by milling into the mass a small amount of absolutely dry dehydrated sodium carbonate or the like, for example, calcium carbonate. This decomposes the thionyl chloride without attacking the acid chloride. The necessity of ever having to carry out this step, however, can be avoided by using a slight excess of the sodium salt which will appear in the end as free acid. The acid chloride produced in this way is perfectly stable, probably due to its high state of purity, and can actually be transported in wooden casks. It is believed that the body has not previously been obtained in this condition without further recrystallization.

The 2:3 hydroxynaphthoyl chloride obtained is in a condition in which it may be used for the manufacture of intermediate products for use in producing azo dyestuffs by processes as described in the specification of British Patent No. 262,958. The common salt present will do no harm but will be finally removed, together with the common salt arising from the alkali added when ultimately water is added to the mass.

It has already been indicated that the invention is not limited to the use of the sodium salt of the respective acid but that other inorganic salts of the acids may be used, such as, for example, the magnesium or calcium salts. Also as already mentioned, the invention is applicable to the formation of chlorides of any aromatic ortho-hydroxy-carboxylic acid of naphthalene or other polynuclear hydrocarbon. Furthermore, the thionyl chloride may be admitted to the salt in question in the form of a vapour or as a vaporous suspension. For example, air or other indifferent gas or more or less saturated with thionyl chloride may be passed over or through the salt. In general, however, the method described in detail in the above examples will be found to be the most convenient.

Having thus described my invention, what I claim as new and desire to secure by Letters Patent is:—

1. The process for making a chloride of an aromatic ortho-hydroxy-carboxylic acid of a polynuclear hydrocarbon which consists in bringing about the reaction between thionyl chloride and an inorganic salt of said acid by mechanically mixing said two reagents.

2. The process for making a chloride of an aromatic ortho-hydroxy-carboxylic acid of a poylnuclear hydrocarbon which consists in bringing about the reaction between thionyl chloride and an inorganic salt of said acid by mechanically mixing and grinding together said two reagents.

3. The process for making 2:3 hydroxynaphthoyl chloride which consists in mechanically grinding together an inorganic salt of 2:3 hydroxynaphthoic acid and thionyl chloride.

4. The process for making a chloride of an aromatic ortho-hydroxy-carboxylic acid of a polynuclear hydrocarbon which consists in bringing about the reaction between thionyl chloride and the mono-sodium salt of said acid by mechanically mixing said two reagents.

5. The process for making a chloride of an aromatic ortho-hydroxy-carboxylic acid of a polynuclear hydrocarbon which consists in bringing about the reaction between thionyl chloride and the mono-sodium salt of said acid by mechanically mixing and grinding together said two reagents.

6. The process for making 2:3 hydroxynaphthoyl chloride which consists in mechanically grinding together dry mono-sodium hydroxynaphthoate and thionyl chloride.

In witness whereof I hereunto subscribe my name this 21st day of March, 1927.

ERIC BERKELEY HIGGINS.